Sept. 20, 1966 E. J. SALTZMAN ETAL 3,273,399
TRAVERSING PROBE
Filed June 25, 1964 4 Sheets-Sheet 3
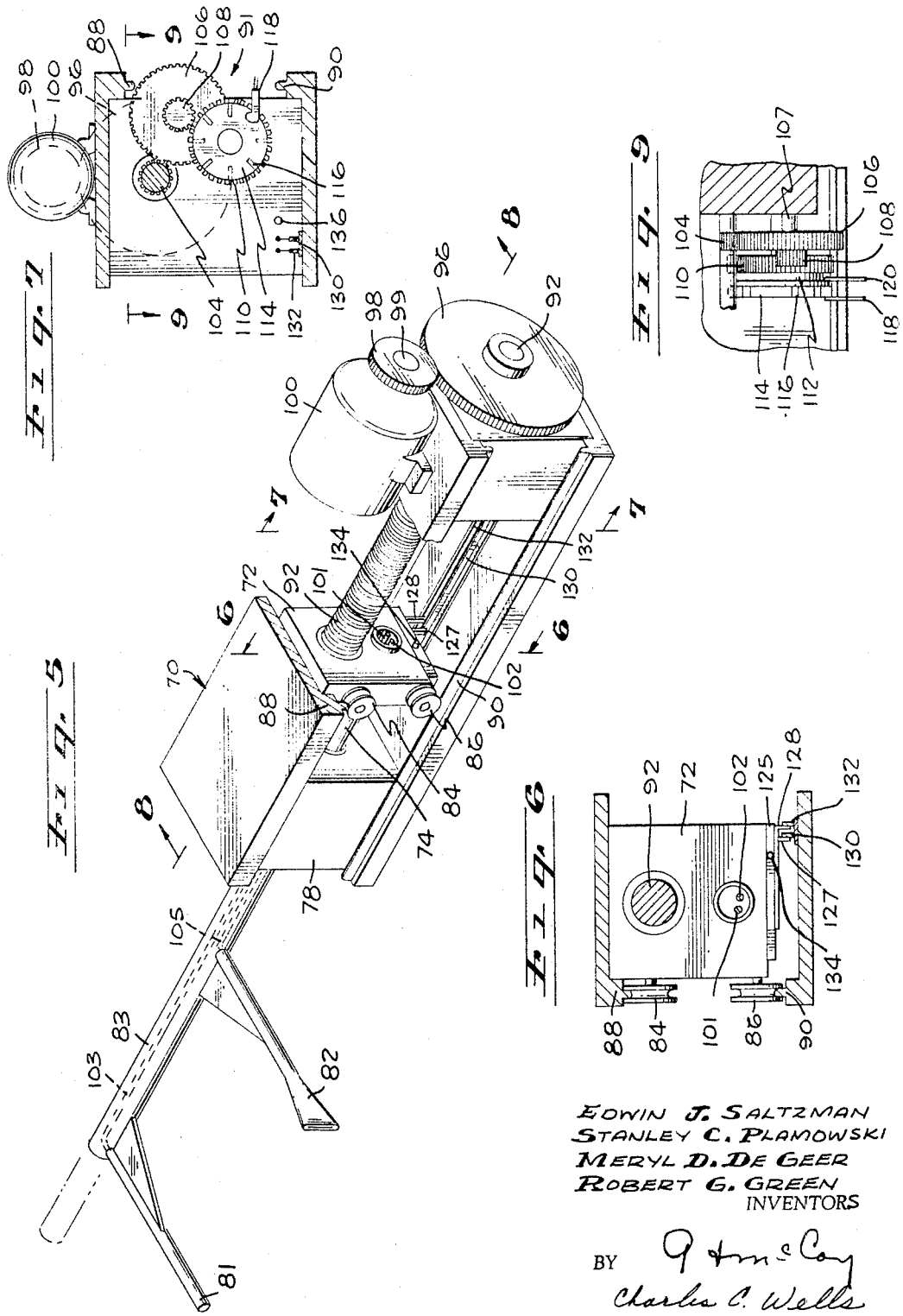
EDWIN J. SALTZMAN
STANLEY C. PLAMOWSKI
MERYL D. DE GEER
ROBERT G. GREEN
INVENTORS
BY
Charles C. Wells
ATTORNEYS Sept. 20, 1966 E. J. SALTZMAN ETAL 3,273,399
TRAVERSING PROBE
Filed June 25, 1964 4 Sheets-Sheet 4
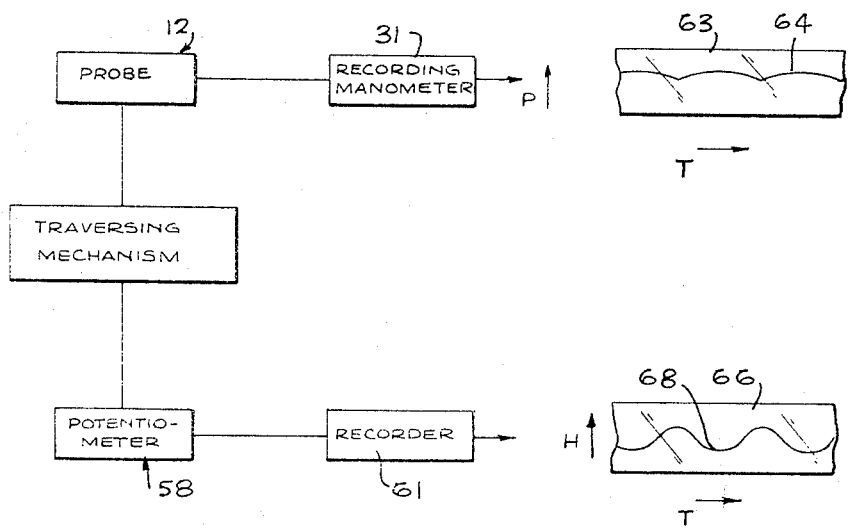
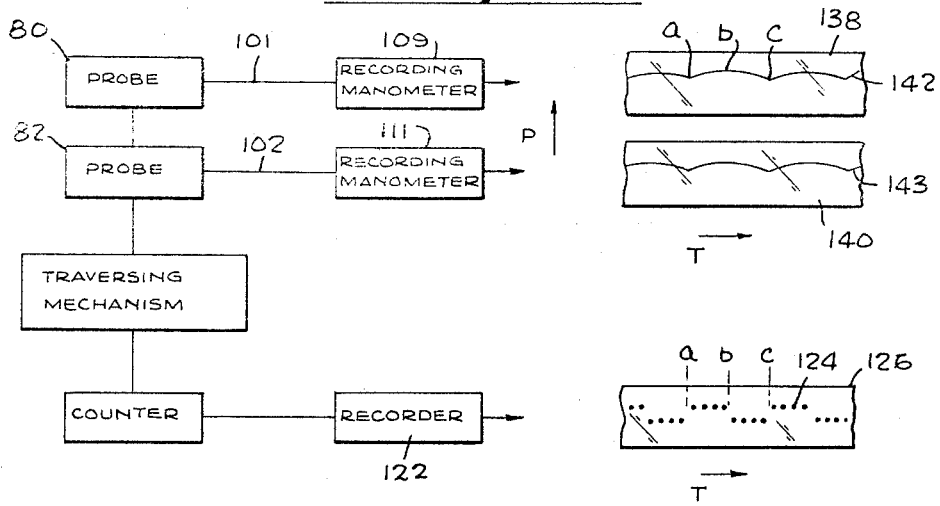
EDWIN J. SALTZMAN
STANLEY C. PLAMOWSKI
MERYL D. DE GEER
ROBERT G. GREEN
INVENTORS
ATTORNEYS

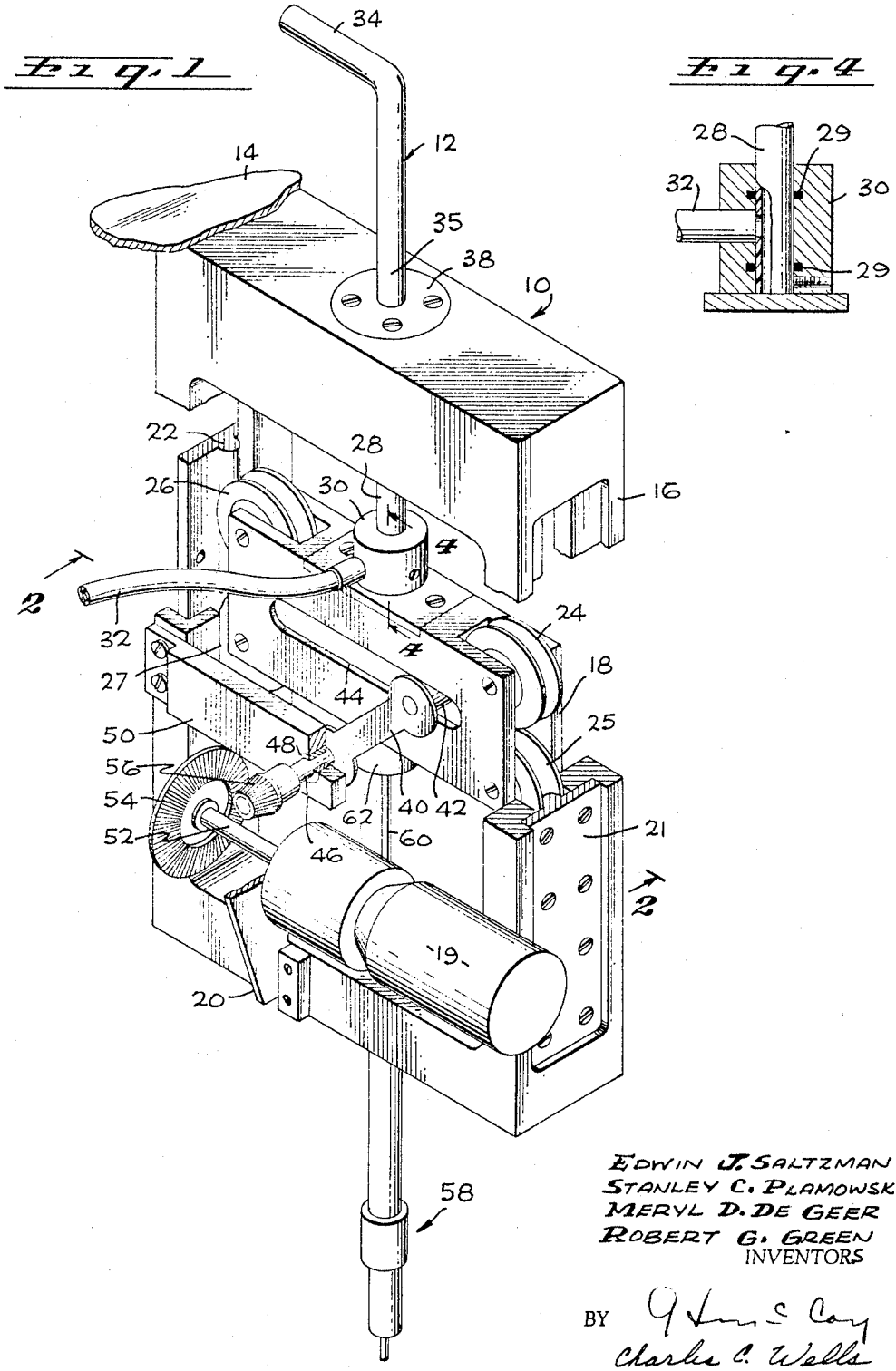

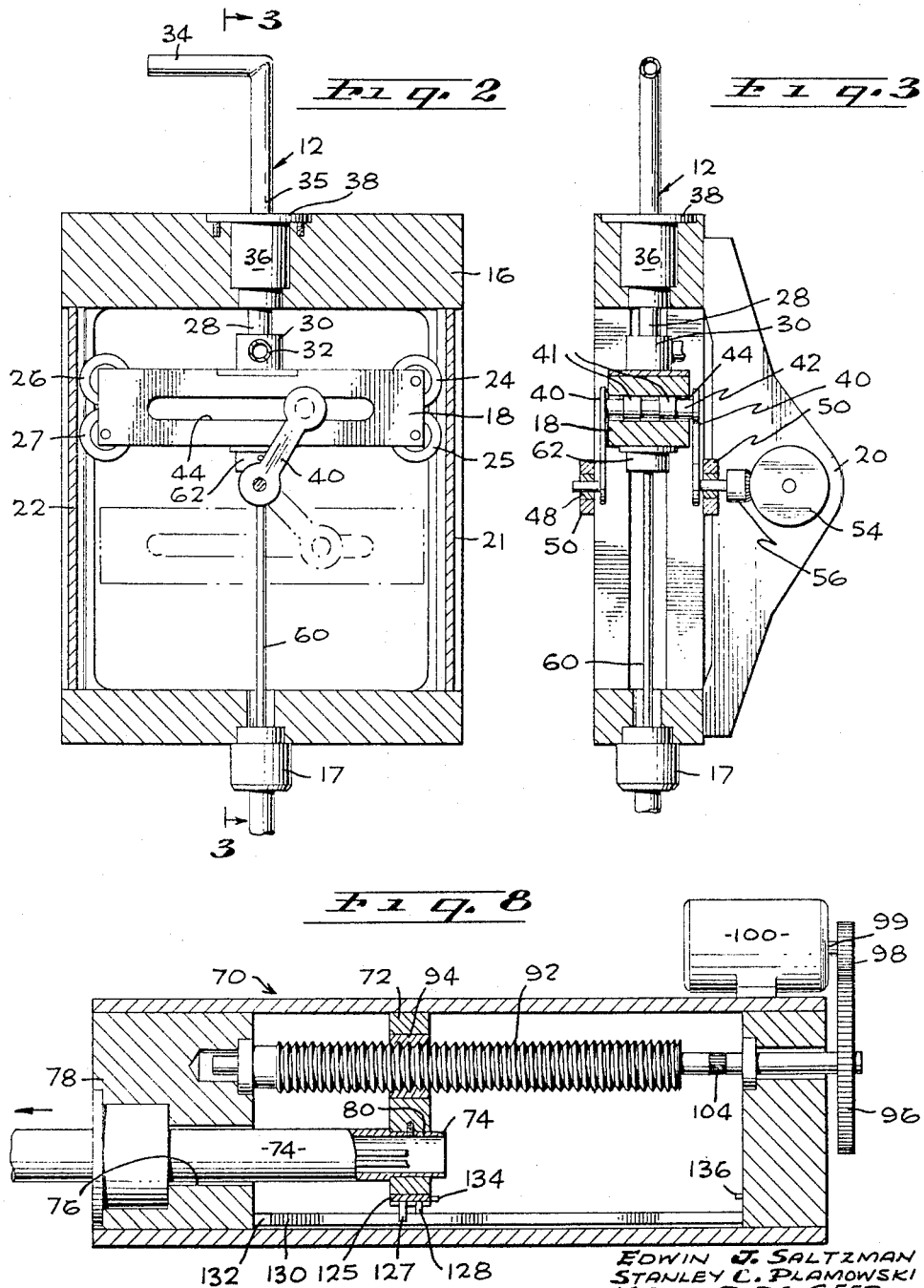

United States Patent Office 3,273,399
Patented Sept. 20, 1966

3,273,399
TRAVERSING PROBE
Edwin J. Saltzman, Kern County, and Meryl D. De Geer, Stanley C. Plamowski, and Robert Grant Green, Los Angeles County, Calif., assignors to the United States of America as represented by the National Aeronautics and Space Administration
Filed June 25, 1964, Ser. No. 378,080
9 Claims. (Cl. 73—389)

The invention described herein may be manufactured and used by or for the Government of the United States of America for governmental purposes without the payment of any royalties thereon or therefor.

This invention relates to instruments for examining the characteristics of fluid flow and is adapted for use in a situation wherein the instrument is held stationary in a flowing fluid or the instrument can be employed on an object or body that is moving rapidly through a relatively stationary fluid. More particularly this invention is a Pitot type flow meter adapted to be mounted on a high speed flight vehicle and capable of accurately defining the distribution of stagnation pressure present in the boundary layer which surrounds such high speed vehicles during flight.

It is well known that the boundary layer which surrounds the surface of a flight vehicle moving through the atmosphere at both subsonic and supersonic speeds greatly affects the performance of the vehicle. Thus, in order to obtain optimum vehicle design it is necessary that conditions in the boundary layer be determined.

The thickness of a boundary layer, and the velocity distribution within a boundary layer surrounding a flight vehicle will vary with the configuration of the vehicle, the fluid properties and the vehicle velocity. However, generally the boundary layer is a relatively thin region in which the relative velocity of the fluid with respect to the vehicle ranges from zero at the vehicle surface to approximately the speed of the vehicle at the outer limits of the boundary layer. Obviously since fluid velocities vary greatly within the boundary layer so will other conditions such as pressure and temperature.

It is therefore necessary to provide a means for accurately examining or measuring conditions in such a boundary layer. Previous devices utilized for this purpose have consisted of a plurality of closely spaced probes mounted on the vehicle such that the boundary layer was sampled at varying distances from the surface of the vehicle. Such a device has severe disadvantages, however, in that the fluid velocity and pressure does not vary uniformly throughout the boundary layer and in a high gradient portion of the boundary layer several probes must be closely spaced if accurate measurements are to be made. Due to this close spacing there is mutual interference between the probes which adversely affects the accuracy of any measurement made therewith. In addition, the requirement for recording instrumentation is complicated in that it is necessary to provide a separate recording element for each probe.

The present invention provides an instrument which makes it possible to obtain an accurate boundary layer profile using only a limited number of probes, usually one or two, and the instrumentation required for recording and measuring is (1) an instrument for measuring and recording the pressure conditions encountered by each probe, and (2) an instrument for determining and recording the position of the probe with respect to the vehicle surface. Inasmuch as the probes are mounted in a fixed position to a single mast only one instrument is required for probe position even though two probes are employed. Two embodiments of a traversing mechanism for extending and retracting the probe are disclosed herein. One embodiment employing a rotary crank mechanism for moving the probe at a relatively rapid cyclic motion is used in applications wherein the speed of the flight vehicle varies considerably. The probe position in this embodiment is monitored by a potentiometer device. A second embodiment of the traversing mechanism is for use on a flight vehicle in relatively steady state flight conditions. The probe in this embodiment is moved at a slower rate by a finely threaded screw-drive mechanism and probe position is monitored by means of a device for counting the number of revolutions of the screw-drive mechanism.

It is therefore a principal object of this invention to provide an instrument for continuously measuring and recording conditions in fluid flow.

Another object of this invention is to provide an apparatus for measuring and recording boundary layer conditions adjacent the aerodynamic surfaces of a rapidly moving flight vehicle.

A further object of this invention is to provide an instrument for mounting on a flight vehicle that includes a probe which is continuously translated normal to the surface of the rapidly moving flight vehicle to examine the boundary layer therearound.

These and other objects and advantages of the present invention will become more apparent when considering the following detailed description in conjunction with the accompanying drawings wherein:

FIG. 1 is a pictorial view, partially in section, illustrating a first embodiment of the probe traversing mechanism wherein a rotary crank mechanism is employed to drive a single probe;

FIG. 2 is a cross-sectional view taken along lines 2—2 of FIG. 1;

FIG. 3 is a cross-sectional view taken along lines 3—3 of FIG. 2;

FIG. 4 is a cross-section of the pressure manifold;

FIG. 5 is a pictorial view, partially in section, illustrating a second embodiment of the invention which employs a screw-drive mechanism for driving a dual probe;

FIG. 6 is a cross-sectional view taken along lines 6—6 of FIG. 5;

FIG. 7 is a cross-sectional view taken along lines 7—7 of FIG. 5 which show the details of the screw-drive mechanism;

FIG. 8 is a cross-sectional view taken along lines 8—8 of FIG. 5;

FIG. 9 is a cross-sectional view taken along lines 9—9 of FIG. 7;

FIG. 10 is a schematic illustration of an instrument which utilizes the probe traversing mechanism illustrated in FIG. 1; and FIG. 11 is a schematic illustration of an instrument which employs the probe traversing mechanism illustrated in FIG. 5.

Referring now to FIG. 1 which illustrates an embodiment of the invention wherein a traversing mechanism 10 is employed to move a probe 12 normal to the exterior surface 14 of a flight vehicle. A small section of the skin or exterior surface 14 of the vehicle is shown herein to illustrate the relative position of the probe with respect to the surface of the vehicle. The brackets and support members required to mount the traversing mechanism in a flight vehicle are not shown herein, but it would be a simple matter to provide such brackets as required by each particular application of the invention. The probe traversing mechanism consists of probe 12, an outer housing 16, a probe carrier 18 mounted for reciprocation in the outer housing and an electric motor 19 mounted on a motor support bracket 20 attached to housing 16. Motor 19 drives probe carrier through a gear and crank arrangement which will be more fully described hereinafter.

The power supplies necessary to operate the electric motor and other components of this invention are not illustrated since their construction and application are well known.

Housing 16 has a pair of guide rails 21 and 22 attached thereto which cooperate with guide rollers 24, 25, 26 and 27, rotatably mounted in probe carrier 18. Probe 12 is attached at its lower end 28 to a pressure manifold 30 which is mounted on the probe carrier. Manifold 30 is provided with O-ring seals 29 to prevent leakage (see FIG. 4). A flexible hose 32 is suitably attached at one end to manifold 30 and the other end of the hose is connected to a conventional recording manometer device 31 (shown schematically in FIG. 10). The probe also includes an upper end 34 which forms a Pitot tube and an intermediate portion 35 which is movably mounted through a linear ball bushing 36 (see FIG. 2) secured in case 16 by bearing retainer 38.

The probe carrier reciprocates vertically within housing 16 and the probe moves therewith. The probe carrier is driven by a crank arm 40 which has a shaft 42 rotatably mounted thereto. Shaft 42 with roller bearings 41 mounted thereon extends through slot 44 formed in the probe carrier to drive the probe carrier when the crank is rotated. The other end of crank arm 40 is fixed to one end of a rotatably mounted crankshaft 46. Crankshaft 46 is supported for rotation by bushing 48 mounted in a support bar 50. A beveled drive gear 54 mounted on output shaft 52 of motor 19 drives bevel bear 56 fixed to crankshaft 46 to rotate the crankshaft.

A conventional type potentiometer 58 secured to the bottom of outer case 16 by collar 17 is connected to the probe carrier by means of a rod 60. Rod 60, which is also the core of the potentiometer, is secured at its upper end to a bracket 62 mounted on the under side of the probe carrier. Thus, as the probe carrier reciprocates vertically, probe 12 and rod 60 move therewith. Movement of rod 60 varies the resistance and thus the output of potentiometer 58. The potentiometer is connected to a conventional recording device 61 (see FIG. 10) which converts the electrical output of the potentiometer to a visual record in the form of a film strip 66.

As mentioned heretofore, recording manometer 31 and recorder 61 are conventional devices, but for purposes of clarity they will be briefly described herein.

The recording manometer is a device which includes a light source, a movable mirror for reflecting a beam of light from the light source against a moving film strip 63 to expose certain areas of the film. A movable diaphragm or other pressure responsive device is connected to the mirror and the Pitot probe, by means of flexible hose 32, so as to move the same in response to pressure changes within the Pitot probe. When the probe is in operation the pressure in the Pitot tube will vary from a minimum value when the probe is retracted to a position near the vehicle surface to a maximum value when the probe is fully extended. The mirror is pivoted by the pressure responsive device as the pressure changes and thus the impact point of the reflected light beam on the moving film strip varies. When the film strip is developed the portion of the film exposed by the light beam is in the form of a curve, as indicated at 64, FIG. 10, which indicates the pressures encountered by the probe.

Recorder 61 is a similar device except that the light reflecting mirror is actuated by an electrical device controlled by the output of potentiometer 58. Curve 68 developed on film strip 66 in this instance, indicates the position of the probe with respect to the surface of the vehicle.

In operation, assuming the invention is mounted on a flight vehicle undergoing a flight test, the traversing mechanism is actuated to begin operation of probe 12 and rod or potentiometer core 60. At the same time recording manometer 31 and recorder 61 are turned on so as to record simultaneously the pressure encountered by the probe and the position of the probe with respect to the surface of the flight vehicle. After the flight test is completed the film strips 63 and 66 are developed to provide visual records that, when properly correlated, indicate the exact pressure encountered by the probe at each position thereof.

While the embodiments described herein employ two film strips in recording probe position and pressures encountered, it should be understood that a recording apparatus could be provided that is capable of recording the pressure and probe position on a single film strip.

Referring now to FIG. 5 which illustrates a second embodiment of a probe traversing mechanism which includes an outer housing or case 70 and a probe carrier 72 mounted for reciprocation within case 70. A tubular mast 74 (see FIG. 8) is slidably mounted through linear ball bushing 76 mounted in end portion 78 of the case and end section 80 of the mast is attached to probe carrier 72. A pair of Pitot probes 81 and 82 are fixed in spaced relation to end section 83 of the mast.

Probe carrier 72 has a pair of guide rollers 84 and 86 rotatably mounted thereon and these guide rollers ride on guide rails 88 and 90 formed along the side of case 70. The probe carrier is driven by a finely threaded rod 92 that turns in an internally threaded collar 94 that is rigidly secured in the probe carrier. Each end of rod 92 is journalled in thrust bearings to eliminate end play. The threaded rod is rotated by a gear 96 fixed to one end thereof and gear 96 is driven by gear 98 fixed to output shaft 99 of reversible electric motor 100.

Flexible hoses 101 and 102 pass to mast 74 to a position where the ends thereof are connected, respectively, to extensions 103 and 105 of probes 81 and 82 which terminate near the bottom opening of mast 74. The other ends of hoses 101 and 102 are connected to recording manometers 109 and 111 as shown schematically in FIG. 10. The recording manometers are identical to the one described in the first embodiment and provide the same type of record.

A mechanism 91 for counting the number of revolutions made by threaded rod 92 and making a record that indicates probe position is illustrated in FIGS. 7 and 9. This mechanism includes a gear 104 formed on rod 92 for rotation therewith. Gear 104 drives a gear 106 journalled on a shaft 107 mounted in case 70. Gear 106 has a smaller gear 108 coaxially mounted on one side thereof which meshes with gear 110 to drive a timing wheel attached thereto. The timing wheel includes a conductor portion 112 and an insulator portion 114 having electrical contact segments 116 disposed around the periphery thereof. A pair of electrical contact arms 118 and 120 are suitably mounted so as to be in contact with the periphery of the timing wheel on each side thereof. As the timing wheel is rotated by the gearing arrangement just described the contact segments contact arm 118 to complete a circuit (not shown) and deliver a signal to a recording device 122. Contact arm 120 is in constant contact with conductor portion 112.

Recorder 122 is a conventional device similar to the recording manometers in that a light beam from a light source is reflected from a mirror onto a moving film strip to expose certain areas of the film and thus prepare a record from which probe position can be determined. The light source is flashed by the signal generated when contact arm 118 contacts one of the contact segments on the periphery of the timing wheel. The light flashes reflected by the mirror exposes a series of dots 124 on a film strip 126. It should be noted that the dots 124 are series staggered rather than being in a horizontal line. The dots are staggered so as to indicate whether the probe is being extended or retracted. The staggering of the dots is accomplished by pivoting the reflecting mirror in recorder 122 each time the motor 100 is reversed to reverse the direction of travel of probe 74.

The electrical circuitry for driving and providing power to the various components of this second embodiment are not disclosed herein since such circuitry is well known to those skilled in the art to which this invention pertains. However, certain mechanical features, such as the electrical contact elements which are incorporated into the structure of the probe traversing mechanism, are described immediately below.

An insulator block 124 (see FIG. 6) is attached to the lower surface of probe carrier 72. Insulator block 125 has a pair of electrical contact wipers 127 and 128 attached thereto which normally engage a pair of contact rails 130 and 132 (see FIG. 6) attached to housing 70 of the probe traversing mechanism. Contact rail 130 is shorter (see FIG. 8) than contact rail 132. In addition, a contact button or boss 134 is mounted on the insulator block and this boss contacts a similar boss 136 (see FIG. 7 or 8) mounted on the outer housing.

The second embodiment of the probe traversing mechanism operates as follows, assuming that the parts are in the position shown in FIG. 8 and threaded rod 92 is being rotated such that the probe is being extended outwardly, i.e., traveling in the direction of the arrow in FIG. 8. When the probe reaches a fully extended position in which probe carrier 72 is adjacent to end portion 78 of housing 70, the contact wiper 127 is disengaged from contact rail 130 to actuate circuitry (not shown) which reverses motor 100. The probe and probe carrier are then retracted until boss 134 comes into contact with boss 136 to actuate circuitry (not shown) to again reverse motor 100 and move the probe outwardly.

Referring now to FIG. 11, the record devleoped on the film strips will be discussed. The film strips 138 and 140 developed by manometers 109 and 111 are identical except that the shape of the curves 142 and 143 formed thereon might differ since each manometer is controlled by a different Pitot probe. For this reason only film strip 138 will be discussed. It will be noted that curve 142, which indicates the pressure encountered by probe 81, varies from a minimum value at point in time indicated by $a$, to a maximum at point $b$ and then back to a minimum at point $c$. When the curve from point $a$ to $b$ is being developed the probe is being extended. When point in time $b$ is reached the direction of probe travel is reversed and the curve falls off to a minimum value at point $c$ as the probe is retracted.

The points in time $a$, $b$ and $c$ have also been indicated for film strip 126 which has series of staggered dots 124 developed thereon. The series of dots from point $a$ to $b$ are elevated with respect to those from $b$ to $c$. The upper series of dots indicates that the probe is being extended whereas the lower series of dots are developed when the probe is being retracted. As discussed heretofore a dot is formed or expoesd on the film strip each time the contact arms 118 and 120 come into contact with one of the segments 116 on the periphery of the timing wheel. The gear ratio employed in counting mechanism 91 is designed such that each revolution of threaded rod 92 rotates the timing wheel sufficiently to bring one of the segments 116 into contact with contact arm 118. Thus it is believed readily apparent that each of the dots 124 on film strip 126 represents one revolution of threaded rod 92. The number of threads per inch on rod 92 is known so it is also known (or can be calculated) what distance one revolution of rod 92 will extend or retract the probe and probe carrier. Hence, by correlating and comparing film strips 138 and 140 with film strip 126, it is possible to determine the exact pressure encountered by each probe at every position thereof relative to the surface of a flight vehicle.

This completes the detailed description of the invention. While only two preferred exemplary embodiments of the invention have been described herein it should be understood that there will be many changes and modifications thereto which can be made without departing from the spirit and scope of the invention as defined by the appended claims. For example, the instrument could, with minor modifications, be utilized for the study of fluid properties in the region of a bow shock wave or for the study of wake flow behind bodies or wings. In addition, the instrument could be altered to include temperature sensing probes and suitable recording apparatus for studying and defining the temperature profile of a boundary layer or bow shock wave.

What is claimed is:

1. An instrument for examining and recording conditions existing in a flowing fluid comprising:
    (a) a probe adapted for immersion in the flowing fluid to sense the conditions existing therein;
    (b) a traversing mechanism coupled to said probe for extending and retracting said probe in a predetermined cyclic manner;
    (c) a first means connected to said traversing mechanism for monitoring and recording the position of said probe, and
    (d) a second means connected to said probe for recording the conditions sensed by said probe, whereby a record is obtained which indicates the exact conditions encountered by said probe at every position thereof.

2. The instrument recited in claim 1 wherein said traversing mechanism includes:
    (a) an outer case;
    (b) a probe carrier mounted for reciprocation in said outer case to drive said probe, and
    (c) driving means mounted on said outer case and connected to said probe carrier for causing said probe carrier to reciprocate within said outer case.

3. The instrument recited in claim 1 wherein said traversing mechanism includes:
    (a) an outer case;
    (b) a reversible electric motor mounted on said outer case;
    (c) a probe carrier mounted for reciprocation in said outer case to drive said probe;
    (d) a threaded rod journalled for rotation in said outer case;
    (e) said threaded rod being threadably engaged with an internally threaded collar fixed in said probe carrier, whereby rotation of said threaded rod will move said probe carrier relative to said threaded rod and said outer case, and
    (f) gear means for providing a driving connection between said motor and said threaded rod.

4. An instrument for continuously monitoring conditions in a boundary layer adjacent a rapidly moving body comprising:
    (a) a probe positioned adjacent to the body for sensing conditions in the boundary layer;
    (b) a traversing mechanism mounted in the body and connected to said probe for extending and retracting the probe in a predetermined path through the boundary layer;
    (c) a first means connected to said probe for recording the conditions sensed by said probe, and
    (d) a second means connected to said traversing mechanism for monitoring and recording the position of said probe with respect to said body; whereby a record is obtained from said first and second means that indicates the exact conditions encountered by said probe at every position thereof.

5. An instrument as recited in claim 4 wherein:
    (a) said probe includes a Pitot tube for sampling the pressures in the boundary layer, and
    (b) said first means is a recording manometer.

6. An instrument for continuously sampling and recording stagnation pressures in the boundary layer around a rapidly moving flight vehicle, said instrument comprising:
  (a) a Pitot tube probe disposed adjacent an external surface of the vehicle for sampling the pressures in the boundary layer;
  (b) a traversing mechanism mounted in said vehicle and connected to said probe for imparting cyclic motion thereto;
  (c) said traversing mechanism including an outer case, a probe carrier mounted for reciprocation in said outer case to drive said probe, and driving means mounted on said outer case and connected to said probe carrier for causing said probe carrier to reciprocate within said outer case;
  (d) a first means mounted on said outer case for monitoring the position of said probe;
  (e) a second means connected to said first means for recording the position of said probe; and
  (f) recording means connected to said probe for recording the pressures encountered by said probe; whereby a record is provided which indicates exactly the pressures encountered by said probe at every position thereof.

7. The instrument recited in claim 6 wherein:
  (a) said probe is attached to said probe carrier; and
  (b) said first means is a potentiometer device that includes a rod member fixed to said probe carrier whereby movement of said probe carrier will vary the output of said potentiometer.

8. The instrument recited in claim 6 wherein said driving means includes:
  (a) a reversible electric motor mounted on said outer case;
  (b) a threaded rod journalled for rotation in said outer case;
  (c) said threaded rod being threadably engaged with an internally threaded collar fixed in said probe carrier, whereby rotation of said threaded rod will move said probe carrier relative to said threaded rod and said outer case; and
  (d) gear means for providing a driving connection between said motor and said threaded rod.

9. The instrument recited in claim 8 wherein said first means includes apparatus that monitors the position of said probe by counting the revolutions of said threaded rod.

References Cited by the Examiner
UNITED STATES PATENTS
2,648,926  8/1953  Bur _____ 73—421.5

LOUIS R. PRINCE, *Primary Examiner.*